(12) United States Patent
Qian et al.

(10) Patent No.: US 8,217,943 B2
(45) Date of Patent: Jul. 10, 2012

(54) DISPLAYING CELLULAR ANALYSIS RESULT DATA USING A TEMPLATE

(75) Inventors: Cheng Qian, Miami, FL (US); Ziling Huo, Miami, FL (US); Patricio J. Vidal, Miami, FL (US)

(73) Assignee: Beckman Coulter, Inc., Brea, CA (US)

( * ) Notice: Subject to any disclaimer, the term of this patent is extended or adjusted under 35 U.S.C. 154(b) by 528 days.

(21) Appl. No.: 11/408,455

(22) Filed: Apr. 21, 2006

(65) Prior Publication Data

US 2007/0247463 A1    Oct. 25, 2007

(51) Int. Cl.
 *G06T 11/20* (2006.01)
(52) U.S. Cl. ........................................... 345/440
(58) Field of Classification Search ............. 382/134
 See application file for complete search history.

(56) References Cited

U.S. PATENT DOCUMENTS

| | | | |
|---|---|---|---|
| 4,596,035 A | 6/1986 | Gershman et al. | |
| 5,230,026 A | 7/1993 | Ohta et al. | |
| 5,812,419 A | 9/1998 | Chupp | |
| 5,995,645 A * | 11/1999 | Soenksen et al. | 382/133 |
| 6,055,325 A | 4/2000 | Garini et al. | |
| 6,137,897 A | 10/2000 | Emi et al. | |
| 6,246,786 B1 * | 6/2001 | Nishikiori et al. | 382/134 |
| 6,356,654 B1 * | 3/2002 | Loce et al. | 382/162 |
| 6,430,309 B1 | 8/2002 | Pressman et al. | |
| 6,466,690 B2 | 10/2002 | Bacus et al. | |
| 6,690,817 B1 | 2/2004 | Cabib et al. | |
| 6,788,818 B1 | 9/2004 | Krumm et al. | |
| 6,873,725 B2 * | 3/2005 | Xu | 382/154 |
| 2002/0186875 A1 | 12/2002 | Burmer et al. | |
| 2003/0083850 A1 | 5/2003 | Schmidt et al. | |
| 2004/0047502 A1 * | 3/2004 | Xu | 382/154 |
| 2004/0207625 A1 * | 10/2004 | Griffin et al. | 345/440 |
| 2005/0035974 A1 | 2/2005 | Nair et al. | |
| 2006/0024756 A1 | 2/2006 | Tibbe et al. | |
| 2006/0045348 A1 | 3/2006 | Kiros et al. | |

OTHER PUBLICATIONS

Bass, H.W., et al "Telomeres Cluster De Novo Before the Initiation of Synapsis: A Three-dimensional Spatial Analysis of Telomere Positions before and during Meiotic Prophase", J Cell Biol, vol. 137, No. 1, pp. 5-18 (Apr. 7, 1997).

Wulf G et al, Multidrug resistance phenotype in patients with chronic lymphocytic leukemia as detected by immunofluorescence (FACS) and Northern blot analysis, Leukemia Research, New York, NY, vol. 18, No. 7, Jul. 1, 1994, pp. 475-484.

Kirsten Skarstad, et al., "Cell Cycle Parameters of Slowly Growing *Escherichia coli* B/r Studied by Flow Cytometry", Journal of Bacteriology, vol. 154, No. 2, May 1983, p. 656-662.

(Continued)

*Primary Examiner* — Edward Martello
(74) *Attorney, Agent, or Firm* — K&L Gates, LLP; Richard S. Handley (57) ABSTRACT

In accordance with the principles of the invention, methods, systems, and computer-readable mediums are provided for displaying cellular analysis result data including accessing cellular analysis result data, accessing data of at least one template, and displaying the cellular analysis result data and the data of at least one template by overlaying the cellular analysis result data and the data of the at least one template, wherein the cellular analysis result data is displayed using different display attributes from the displayed data of the at least one template.

27 Claims, 8 Drawing Sheets
(3 of 8 Drawing Sheet(s) Filed in Color)

OTHER PUBLICATIONS

Yasuhiro Wada, et al., "Mechanism of Anticancer Drug Action in Head and Neck Cancer Demonstrated by Flow Cytometry—First Report: Analysis of Mechanism of Cisplatin Action by Three-dimensional Color Display-", Clinical Otorhinolaryngology, vol. 80, No. 7, 1987, p. 1137-1149; 24 pages of English Translation of Wada, et al. reference.

* cited by examiner

Transparent textured ovals: Standard template
Colored dots: Target sample

DISPLAYING CELLULAR ANALYSIS RESULT DATA USING A TEMPLATE

BACKGROUND OF THE INVENTION

1. Field of the Invention

The present invention relates generally to systems and methods of displaying data and, more specifically, relates to systems and methods for displaying target sample cellular analysis result data and template data in an image.

2. Description of Related Art

In analyzing results of cellular analyzers of a target sample, physicians need to compare the results with those of a template. Conventional cellular analyzers provide for the display of graphic results in one-dimensional, two-dimensional and three-dimensional displays that only show the target sample. Physicians who analyze the cellular analysis results must view the graphic results while comparing the image with a template. These template images may be found in a text book or in a separate image. Alternatively, the physician may have a picture of the template image in his mind. In any case, the physician must take these two separate images and compare the two. This may be difficult because the images may not be on the same scale, in the same form of display, etc. This makes the process of analyzing the target sample data inconvenient, inaccurate, time-consuming, and mind-intensive.

As such, there is a need for systems and methods that provide for displaying target sample cellular analysis result data and template data in an image in a manner that enables a physician or user to accurately and efficiently analyze target sample data to identify abnormalities.

SUMMARY OF THE INVENTION

In accordance with the principles of the invention, as embodied and broadly described herein, methods and systems consistent with the principles of the present invention provide for systems, methods, and computer-readable mediums of displaying cellular analysis result data including accessing result data of a cellular analyzer, accessing data of at least one template, and displaying the cellular analyzer result data and the data of at least one template by overlaying the cellular analyzer result data and the data of the at least one template, wherein the cellular analyzer result data is displayed using different display attributes from the displayed data of the at least one template.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are incorporated in and constitute a part of this specification, illustrate several embodiments of the invention and together with the description, serve to explain the principles of the invention, and, together with the description, explain the features and aspects of the invention. In the drawings.

DETAILED DESCRIPTION

Reference will now be made in detail to the present invention, examples of which are illustrated in the accompanying drawings. Wherever possible, the same reference numbers will be used throughout the drawings to refer to the same or like parts.

Overview

Methods and systems consistent with the principles of some embodiments of the present invention provide for a system that enables a user to view and/or analyze displayed data representing cellular analyzer test results. Specifically, methods and systems, consistent with some embodiments of the present invention provide for enabling a user to access target sample data, access template data, and to display this data on a display. The target sample data and the template data may be overlaid in the same image. Further, the user may be able to select different display attributes of the target sample data and the template data in such a manner that the user may identify the target sample data separate from the template data. By displaying the target sample data and the template data in a manner consistent with principles of the present invention, a user may be able to see how close or far away the target sample data is from the template data. Further, the user may be able to determine abnormalities in the target sample.

Cellular Analysis

The present invention may be used to analyze various types of cells, cellular components, body fluids and/or body fluid components. The present invention is particularly useful in analyzing blood samples, which include both a fluid component (serum) and a solid component (various types of cells). In particular, the invention is directed to analyzing cellular components in a blood sample, either whole blood (which contains various types of blood cells) or a cell component fraction. The present invention may also be used to analyze cells obtained from a tissue sample that are separated from connective tissue and suspended in a biologically compatible liquid medium that does not destroy the cells. The present invention may also be used to analyze body fluid samples, platelet rich plasma samples, instrument control fluid samples, etc. The terms "cellular analyzer" and "cellular analysis" are intended to cover at least all of the components as described herein. Further, where target sample data is recited, this term is intended to include target sample cellular analysis result data.

Generation of Raw Data

The body fluids and/or cellular components of body fluids may be subjected to various types of analytical techniques to generate data for analysis and display in accordance with the present invention. The most common techniques are Direct Current to measure the volume of the cell size, Radio Frequency to measure the opacity of the cell, fluorescence, and light scatter to measure the granularity of the cell.

Target Sample Data and Template Data

The target sample data and/or the template data may be in the form of image data including white blood cells (WBC), red blood cells (RBC), platelets, one-dimensional histograms from complete blood count (CBC), WBC differential scattergrams in two and/or three dimensions, reticulocyte differential scattergrams in two and/or three dimensions, nucleated red blood cell (NRBC) differential scattergrams in two or three dimensions, WBC differential histograms in surface image; reticulocyte differential histograms in surface image, NRBC differential histograms in surface image, etc.

System Architecture

Figure 1:
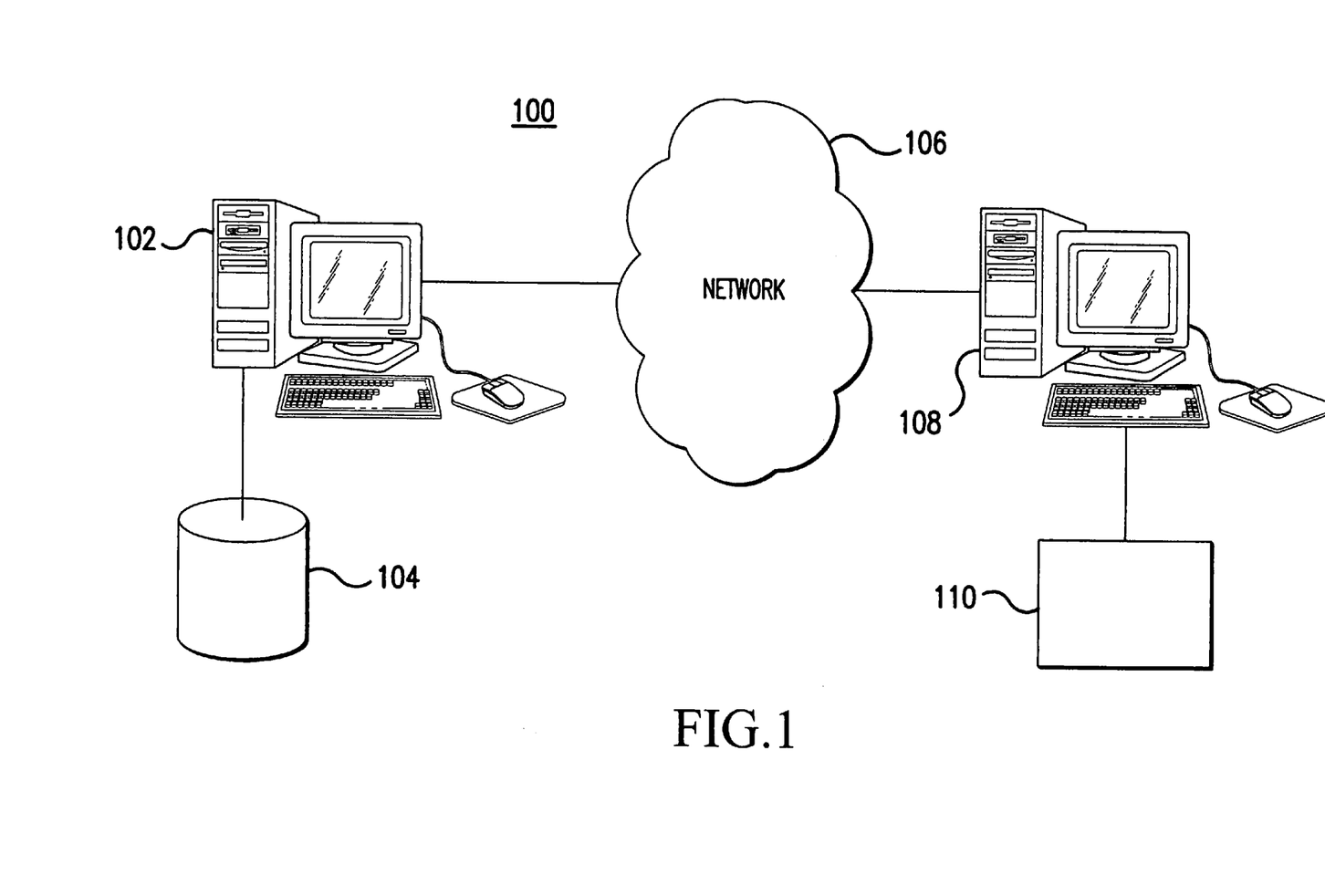
FIG. 1 is an exemplary diagram of a system environment in which systems and methods, consistent with the principles of some embodiments of the present invention, may be implemented.

FIG. 1 is an exemplary diagram of a system environment 100 for implementing the principles of the present invention. The components of system 100 may be implemented through any suitable combinations of hardware, software, and/or firmware. As shown in FIG. 1, system 100 includes a user computer 102. User computer 102 may be communicably linked to a database 104. Alternatively, database 104 may reside directly on network 106 or the contents of database 104 may reside directly on computer 102 or server 108.

System 100 may further include network 106 which may be implemented as the Internet, or any local or wide area network, either public or private. System 100 may further include server 108 and server 108 may be communicably linked to analyzer 110. Analyzer 110 may be implemented as Beckman Coulter hematology instruments, such as LH750 and LH500, etc., to generate the test result data.

It may be appreciated by one of ordinary skill in the art that while only one computer 102, database 104, network 106, server 108 and analyzer 110 are depicted, more than one of these types of devices may be implemented in the system consistent with the principles of some embodiments of the present invention. It may further be appreciated that each of these devices may reside in different locations within the system. For example, analyzer 110 may be directly communicably linked to computer 102, wherein computer 102 may receive data from analyzer 110 directly without operating over the network. It may be still further be appreciated that features consistent with principles of the present invention may be implemented solely within computer 102 as a stand-alone unit where all of the data needed to perform the present invention may reside directly on computer 102 and wherein target sample data from analyzer 110 may be input by the user through an external device of computer 102.

Figure 2:
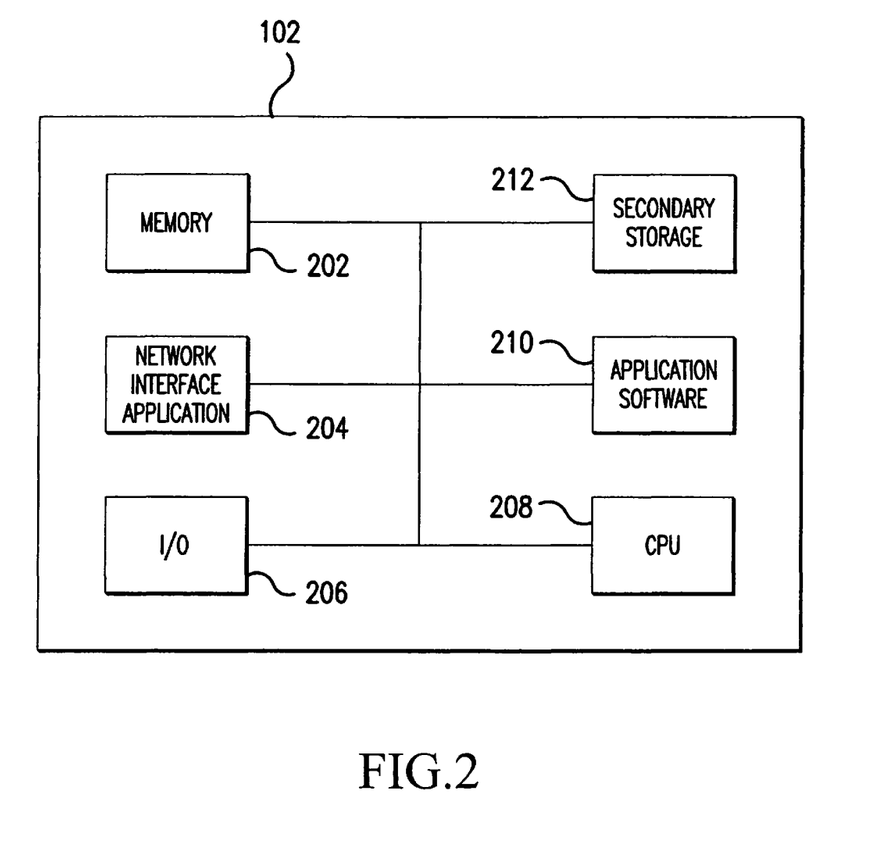
FIG. 2 is an exemplary diagram of main components of a computer, consistent with some embodiments of the principles of the present invention.

FIG. 2 depicts an exemplary block diagram of components included in computer 102. Computer 102 may be any type of computing device, such as a personal computer, workstation, or personal computing device, and may, for example, include memory 202, network interface application 204, input/output devices 206, central processing unit 208, application software 210, and secondary storage 212. Computer 102 may be communicably linked to database 104, server computer 108 and/or analyzer 110.

A user may access network 106 using the network interface application 204, and/or application software 210. Where network 106 may be implemented as the Internet, network interface application 204 may include a conventional browser including conventional browser applications available from Microsoft or Netscape. Application software 210 may include programming instructions for implementing features of the present invention as set forth herein. Application software 210 may include programming instructions for enabling a user to view and/or analyze test result data wherein target sample data is displayed together with template data. Application software 210 may further be implemented as Nevron Chart available from Nevron or MatLab available from Mathworks. Input/output devices 206 may include, for example, a keyboard, a mouse, a video cam, a display, a storage device, a printer, etc.

Figure 3:
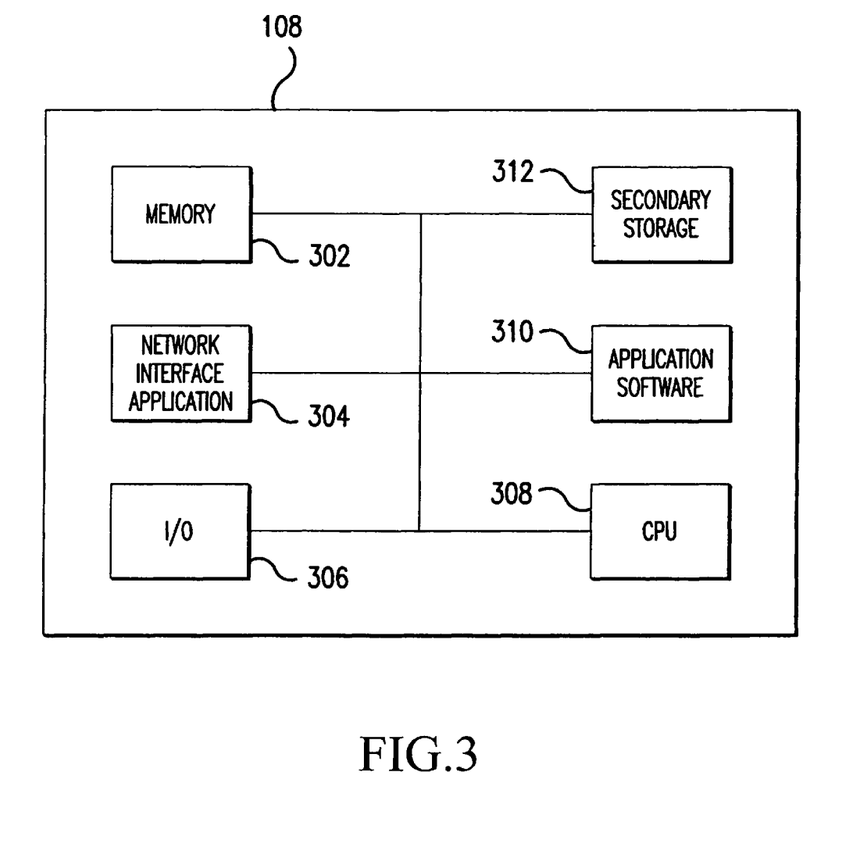
FIG. 3 is an exemplary diagram of components of a server, consistent with the principles of some embodiments of the present invention.

FIG. 3 depicts an exemplary block diagram of the components included in server computer 108. Server computer 108 may include memory 302, network interface application 304, input/output devices 306, central processing unit 308, application software 310, and secondary storage 312 consistent with the principles of some embodiments of the present invention. The components of server computer 108 may be implemented similarly with the components of computer 102.

Functionality

Figure 4:
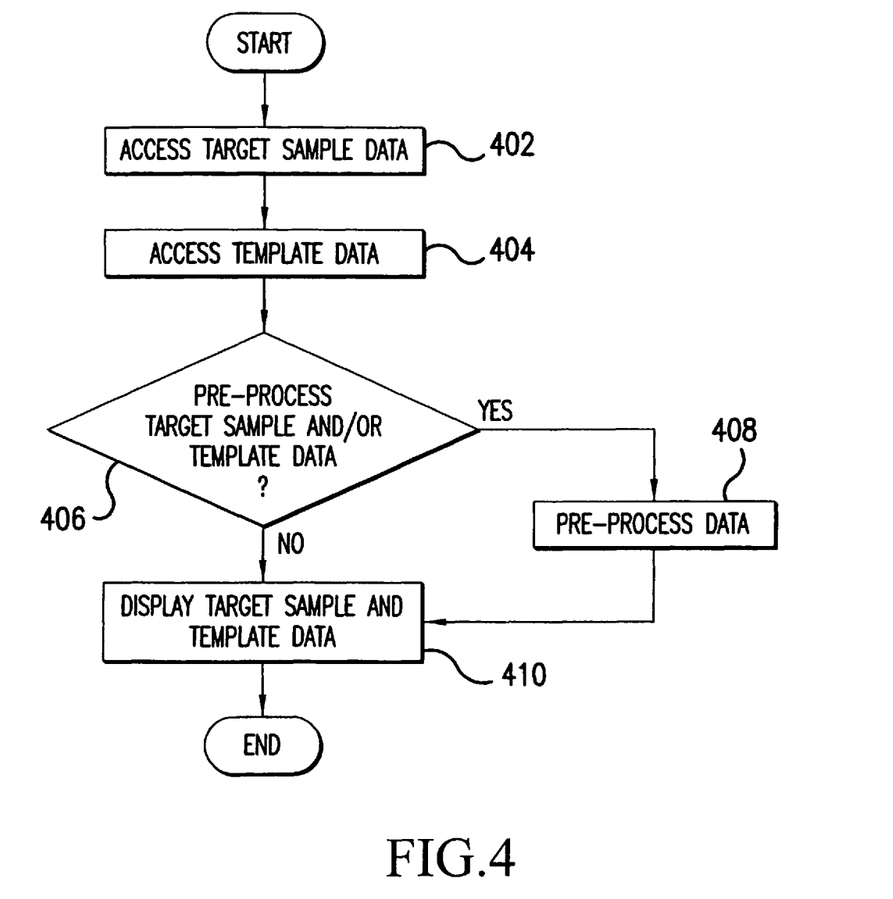
FIG. 4 depicts an exemplary flow diagram of the steps performed by a computer consistent with the principles of some embodiments of the present invention.

FIG. 4 depicts an exemplary flow diagram of the steps performed by computer 102, consistent with some embodiments of the present invention. As shown in FIG. 4, upon identification of the target sample data by the user to analyze, computer 102, through application software 310, accesses target sample data (Step 402). Target sample data may be data representing analysis results of cells performed by analyzer 110. This data may be stored on computer 102, stored in database 104, or on server 108. Upon identification of the template data by the user to analyze, computer 102, through software application 310, accesses template data (Step 404). Template data represents standard data to which the target sample is compared. Template data may represent, for example, an average of many samples, an average of many samples where extraneous data is removed, etc. Template data may be stored on computer 102, stored in database 104, or on server 108.

Once the target sample and template data are accessed, software application 310 makes a determination is made whether or not to pre-process the data to remove any extraneous data (Step 406). For example, if the target sample data was pre-processed at analyzer 110, at server 108, or at computer 102, there may be no need to pre-process the data. If a determination is made that the data should be pre-processed (Step 406, Yes), then the target sample data and/or the template data is pre-processed at Step 408 using known methods, for example, filtering (linear, non-linear, low pass, median), remove outliers, etc., to remove any extraneous data, noise, etc. from the data. Once the data is pre-processed, processing then proceeds to Step 410. If a determination is made that the data should not be preprocessed (Step 406, No), then processing proceeds to Step 410. The determination may be made by the user or may be pre-programmed in the application.

The system may then display both the target sample data and template data on the same display (Step 410), wherein the target sample data and the template data are displayed in such a manner that the two sets of data are displayed using different display attributes. For example, the two sets of data may be differentiated by color, texture, brightness, transparency, smoothness, etc. These different display characteristics may be selected by the user or may be pre-selected by software application 310. The sample target data and the template data may be displayed as a one-dimensional histogram, a two-dimensional histogram, a three-dimensional histogram, a one-dimensional scattergram, two-dimensional scattergram, a three-dimensional scattergram, a three-dimensional surface image of a two-dimensional amplitude distribution (histogram), etc.

Displays

Figure 5:
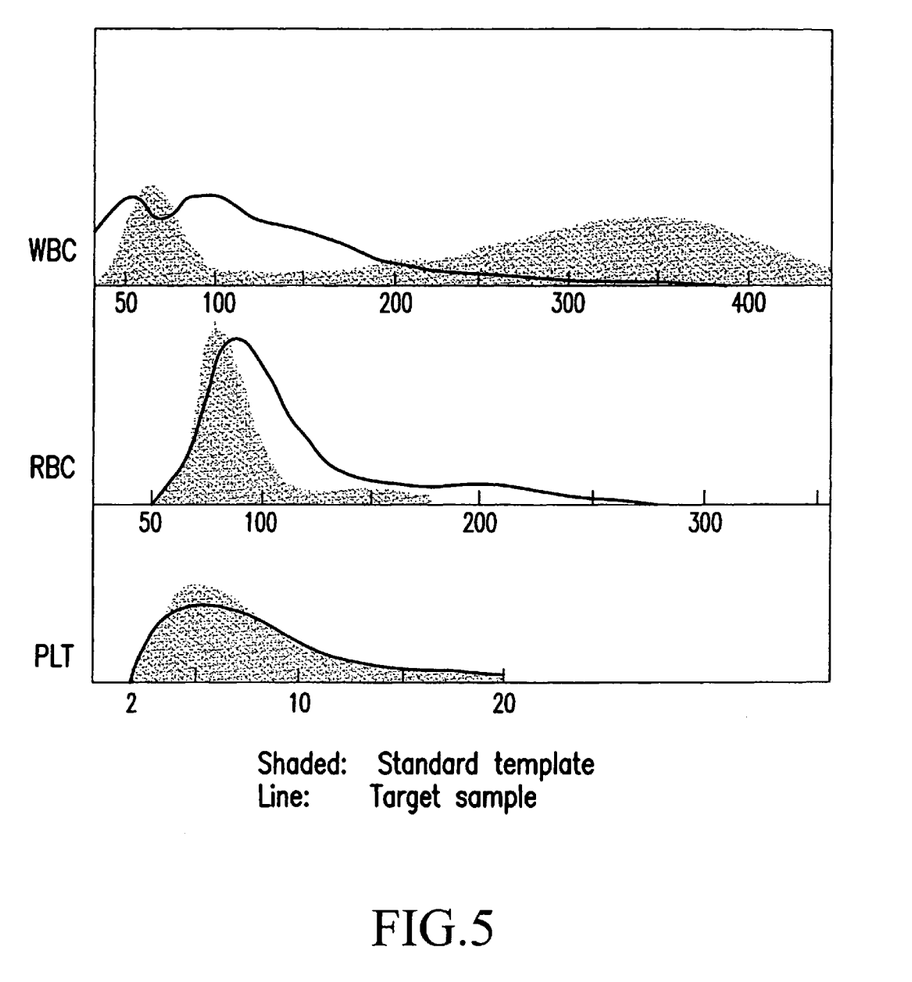
FIG. 5 depicts an exemplary display provided to a user consistent with the principles of some embodiments of the present invention.

FIGS. 5-8 depict exemplary displays provided to user upon completion of the process set forth in FIG. 4. FIG. 5 depicts CBC histograms displayed consistent with the principles of the present invention. In each histogram, the target sample data is depicted as a line and the template data is depicted as a shaded area. The first histogram represents an overlay display of the target sample data and the template data of WBC. The second histogram represents an overlay display of the target sample data and the template data of RBC and the third histogram represents an overlay display of the target sample data and the template data of the platelet (PLT). One skilled in the art may appreciate that by having the target sample data and the template data displayed in the same display, it is easier to see how the two sets of data relate to each other thus saving time and speeding up the diagnosis process.

Figure 6:
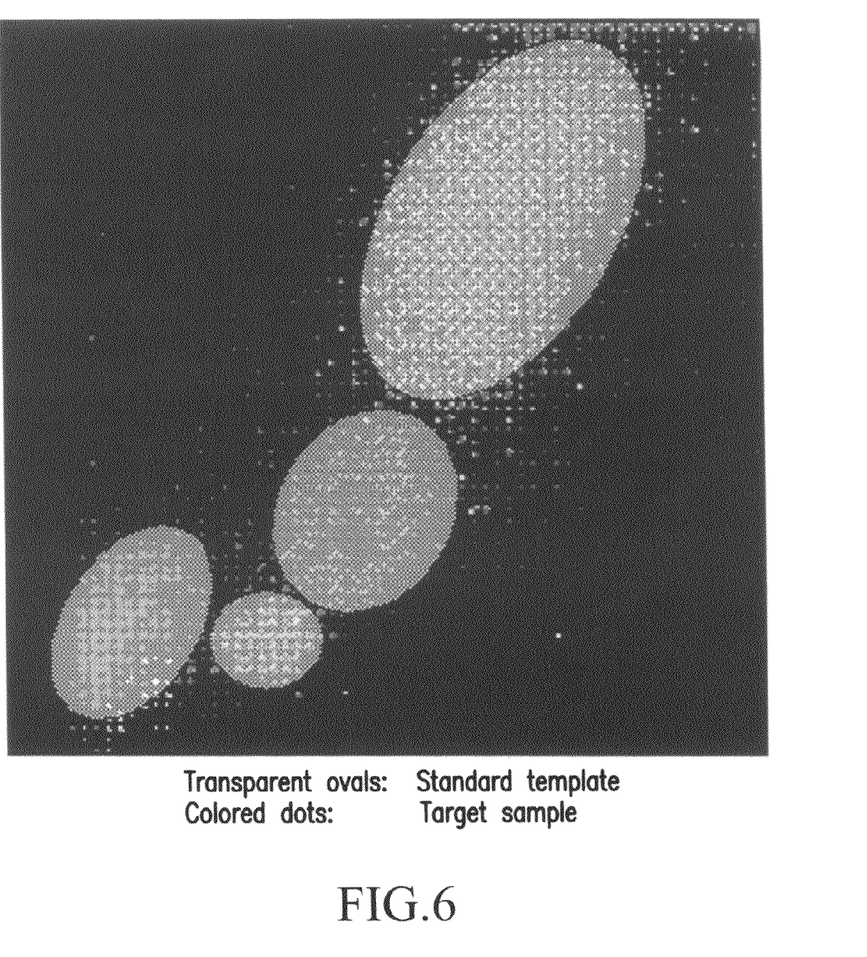
FIG. 6 depicts an exemplary display provided to a user consistent with the principles of some embodiments of the present invention.

FIG. 6 depicts an exemplary display of an overlay of a two-dimensional histogram consistent with the principles of some embodiments of the present invention. As shown in FIG. 6, the target sample data is depicted as dots and the template data is depicted as transparent ovals.

Figure 7:
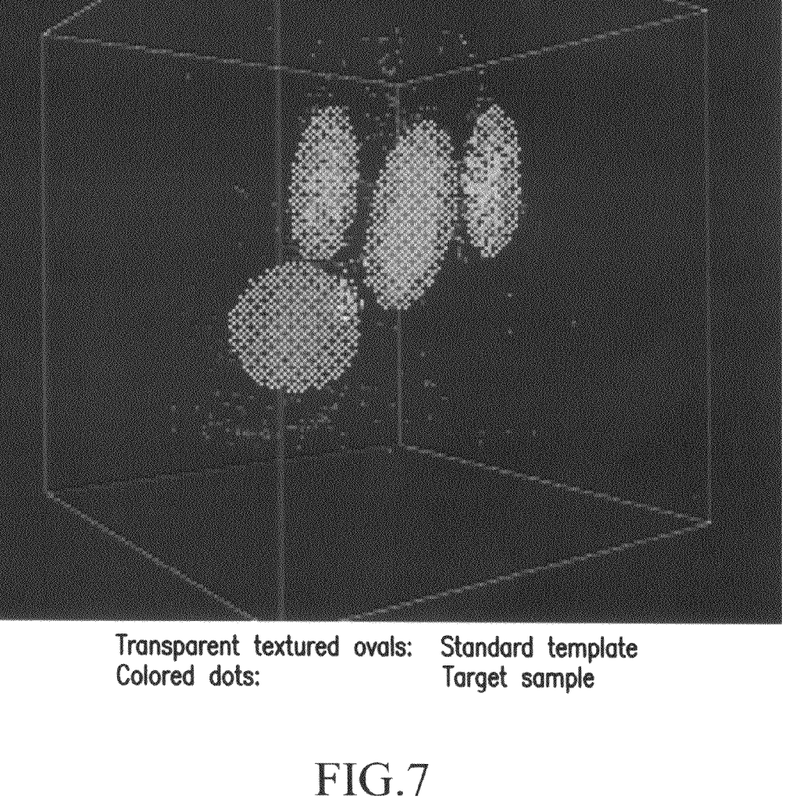
FIG. 7 depicts an exemplary display provided to a user consistent with the principles of some embodiments of the present invention.

FIG. 7 depicts an exemplary display of an overlay display of a three-dimensional histogram. As shown in FIG. 7, the target sample data is displayed as dots and the template data is displayed as transparent textured ovals.

Figure 8:
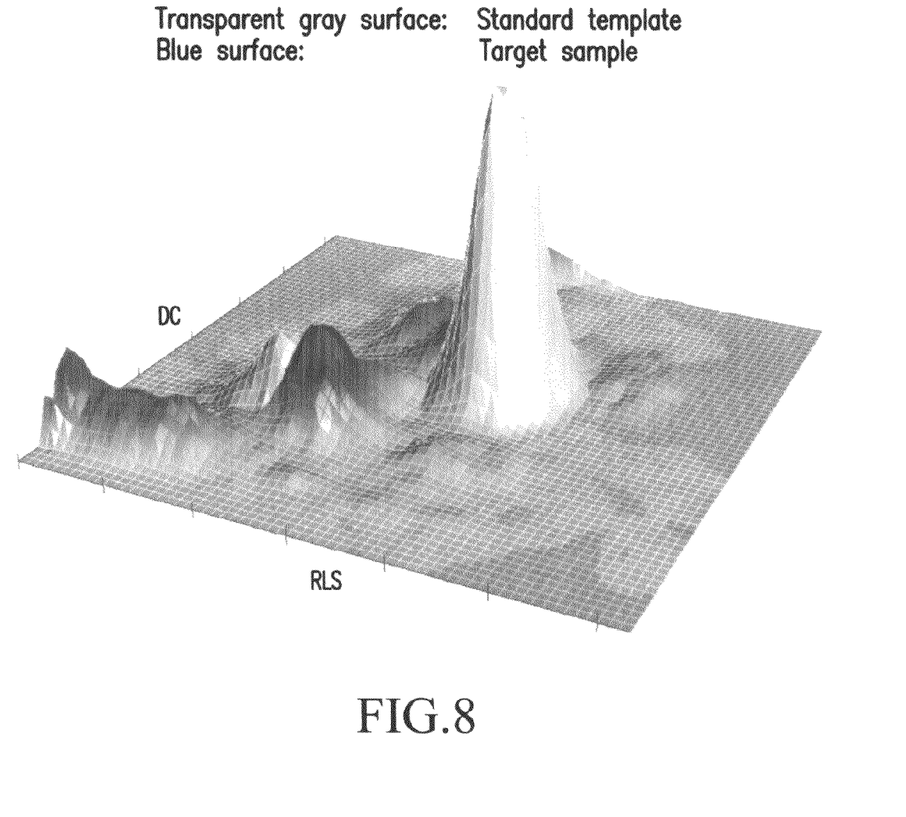
FIG. 8 depicts an exemplary display provided to a user consistent with the principles of some embodiments of the present invention.

FIG. 8 depicts an exemplary display of an overlay display of a three-dimensional surface of a two-dimensional amplitude histogram. As shown in FIG. 8, the target sample data is displayed as a dark surface while the template data is displayed as a transparent lighter surface.

Alternatively, in accordance with principles consistent with some embodiments of the present invention, different display attributes may be implemented to further differentiate the different data sets. For example, in FIG. 8, the target sample data may be depicted in one color while the template data may be depicted in a different color. It may further be appreciated that one or more display characteristics may be employed to differentiate the data sets. For example, in FIG. 7, the target sample may be displayed as red dots while the template data may be displayed as gray ovals.

Template Data

The template data used within system 100 may be standard template data or may be customizable by the physician. The template data may represent a normal and healthy sample or an abnormal sample. Standard template data is data that may be deliberately selected and processed using thousands of samples. Further, by using a preset template, noise and bias may be removed and, ultimately, may be more objective than that summarized or provided by any user. Further, there may be different template data for each variable in an analysis, providing for a multi-variable or multi-parameter analysis. In addition, there may be different templates representing in one-dimensional, two-dimensional, or three-dimensional form in order to provide more data to compare with the target sample data. In order to provide the template data in accordance with the present invention, it is possible to obtain multiple specific disease templates with a current patient sample or target sample. For each variable, there may be one or several collections, or libraries of templates. These collections of templates may be provided with the software application, may be created by the user, may be available at a server on network 106, etc.

Alternatively, the template may be customized by the user. The user may be able to save a sample as a new template. Alternatively, software application may be able to let the user select a group of samples to be averaged to create a new template. These new templates may be added to the collection of templates, be used to create new collections of template, etc. Template collections may be shared between users.

By providing the template data as discussed herein, the target sample may be compared with the template in order to identify abnormalities in the target sample based on, for example, special graphic patterns that may appear in the display. These abnormalities may include chronic lymphocytic leukemia (CLL), acute lymphocytic leukemia (ALL), chronic myologenous leukemia (CML), acute myologenous leukemia (AML), defects in hemoglobin, for example, Thalassemia, etc., sickle cell crisis, etc.

Conclusion

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or hardware alone.

Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

We claim:

1. A method of displaying cellular analysis result data, comprising:

accessing cellular analysis result data generated by a cellular analyzer using a plurality of measurements of cells of a cell suspension from a target cell sample;

accessing data of at least one disease-specific template prepared for display in three dimensional form to indicate a disease, wherein the data of the at least one template is based on the plurality of measurements of cells from at least one predetermined cell sample; and displaying, in the form of three dimensional surfaces, the plurality of measurements of cells respectively of the cellular analysis result data and the data of at least one template by overlaying the cellular analysis result data and the data of the at least one template, wherein the cellular analysis result data is displayed using different display attributes from the displayed data of the at least one template, and wherein the presence or absence of the disease in the target cell sample is indicated by differences in the three dimensional surfaces corresponding respectively to the cellular analysis result data and the at least one disease-specific template.

2. The method of claim 1, wherein the display attributes are at least one of color, texture, brightness, smoothness, and transparency.

3. The method of claim 1, wherein the displayed three dimensional surfaces are three-dimensional surface images of two-dimensional amplitude distributions.

4. The method of claim 1, wherein the data of the at least one template represents one of a normal sample, an averaging of a plurality of normal samples, an abnormal sample, and a sample based on demographics.

5. The method of claim 4, wherein the abnormal sample is a sample with an abnormality having a specific pattern when the data of the abnormal sample is displayed.

6. The method of claim 5, wherein the abnormal sample may be one of a CLL sample, an ALL sample, a CML sample, an AML sample, a Thalassemia sample, and a sickle cell crisis sample.

7. The method of claim 1, wherein the difference in the display of a plurality of positions of the cellular analysis result data and a plurality of positions of the data of the at least one template indicates a hematology anomaly.

8. The method of claim 1, wherein the cellular analysis result data includes at least one of white blood cells, red blood cells, and platelets.

9. The method of claim 1, wherein the data of the at least one template is customizable.

10. A system of displaying cellular analysis result data, comprising:
a memory for storing instructions; and
a processor for executing the instructions stored in the memory to:
access cellular analysis result data, wherein the cellular analysis result data is from a plurality of measurements by a cellular analyzer of cells of a target cell sample;
access data of at least one disease-specific template prepared for display in three dimensional form to indicate a disease, wherein the data of the at least one template includes the plurality of measurements of cells from at least one selected cell sample; and
display, in the form of three dimensional surfaces, the plurality of measurements of cells respectively of the cellular analysis result data and the data of at least one template by overlaying the cellular analysis result data and the data of the at least one template, wherein the cellular analysis result data is displayed using different display attributes from the displayed data of the at least one template, and wherein the presence or absence of the disease in the target cell sample is indicated by differences in the three dimensional surfaces corresponding respectively to the cellular analysis result data and the at least one disease-specific template.

11. The system of claim 10, wherein the display attributes are at least one of color, texture, brightness, smoothness, and transparency.

12. The system of claim 10, wherein the displayed data is in the form of a three-dimensional surface image of a two-dimensional amplitude distribution.

13. The system of claim 10, wherein the data of the at least one template represents one of a normal sample, an averaging of a plurality of normal samples, an abnormal sample, and a sample based on demographics.

14. The system of claim 13, wherein the abnormal sample is a sample with an abnormality having a specific pattern when the data of the abnormal sample is displayed.

15. The system of claim 14, wherein the abnormal sample may be one of a CLL sample, an ALL sample, a CML sample, an AML sample, a Thalassemia sample, and a sickle cell crisis sample.

16. The system of claim 10, wherein the difference in the display of a plurality of positions of the cellular analysis result data and a plurality of positions of the data of the at least one template indicates a hematology anomaly.

17. The system of claim 10, wherein the cellular analysis result data includes at least one of white blood cells, red blood cells, and platelets.

18. The system of claim 10, wherein the data of the at least one template is customizable.

19. A non-transitory computer-readable storage medium, containing instructions, executed by a processor, to perform the method of displaying cellular analysis result data, the method comprising: accessing cellular analysis result data generated by a cellular analyzer using a plurality of measurements of cells from a target cell sample; accessing data of at least one disease-specific template prepared for display in three dimensional form to indicate a disease, wherein the data of the at least one template is based on the plurality of measurements of cells from at least one predetermined cell sample; and displaying, in the form of three dimensional surfaces, the plurality of measurements of cells respectively of the cellular analysis result data and the data of at least one template by overlaying the cellular analysis result data and the data of the at least one template, wherein the cellular analysis result data is displayed using different display attributes from the displayed data of the at least one template, and wherein the presence or absence of the disease in the target cell sample is indicated by differences in the three dimensional surfaces corresponding respectively to the cellular analysis result data and the at least one disease-specific template.

20. The non-transitory computer-readable storage medium of claim 19, wherein the display attributes are at least one of color, texture, brightness, smoothness, and transparency.

21. The non-transitory computer-readable storage medium of claim of claim 19, wherein the displayed data is in the form of one of a three-dimensional surface image of a two-dimensional amplitude distribution.

22. The non-transitory computer-readable storage medium of claim 19, wherein the data of the at least one template represents one of a normal sample, an averaging of a plurality of normal samples, an abnormal sample, and a sample based on demographics.

23. The non-transitory computer-readable storage medium of claim 22, wherein the abnormal sample is a sample with an abnormality having a specific pattern when the data of the abnormal sample is displayed.

24. The non-transitory computer-readable storage medium of claim 23, wherein the abnormal sample may be one of a CLL sample, an ALL sample, a CML sample, an AML sample, a Thalassemia sample, and a sickle cell crisis sample.

25. The non-transitory computer-readable storage medium of claim 19, wherein the difference in the display of a plurality of positions of the cellular analysis result data and a plurality of positions of the data of the at least one template indicates a hematology anomaly.

26. The non-transitory computer-readable storage medium of claim 19, wherein the cellular analysis result data includes at least one of white blood cells, red blood cells, and platelets.

27. The non-transitory computer-readable storage medium of claim 19, wherein the data of the at least one template is customizable.

* * * * *